(12) United States Patent
Ayat et al.

(10) Patent No.: US 12,009,732 B2
(45) Date of Patent: Jun. 11, 2024

(54) ELECTRICAL MACHINE WINDING HAVING IMPROVED COOLING

(71) Applicants: SAFRAN, Paris (FR); SAFRAN HELICOPTER ENGINES, Bordes (FR)

(72) Inventors: Sabrina Ayat, Moissy-Cramayel (FR); Camel Serghine, Moissy-Cramayel (FR); Thomas Klonowski, Moissy-Cramayel (FR)

(73) Assignees: SAFRAN, Paris (FR); SAFRAN HELICOPTER ENGINES, Bordes (FR)

( * ) Notice: Subject to any disclaimer, the term of this patent is extended or adjusted under 35 U.S.C. 154(b) by 111 days.

(21) Appl. No.: 17/432,245

(22) PCT Filed: Feb. 19, 2020

(86) PCT No.: PCT/FR2020/050311
§ 371 (c)(1),
(2) Date: Aug. 19, 2021

(87) PCT Pub. No.: WO2020/169929
PCT Pub. Date: Aug. 27, 2020

(65) Prior Publication Data
US 2022/0190686 A1 Jun. 16, 2022

(30) Foreign Application Priority Data
Feb. 21, 2019 (FR) ........................................ 1901775

(51) Int. Cl.
*H02K 9/20* (2006.01)
*H02K 9/22* (2006.01)

(52) U.S. Cl.
CPC ............... *H02K 9/20* (2013.01); *H02K 9/225* (2021.01)

(58) Field of Classification Search
CPC ................................. H02K 9/20; H02K 9/225
(Continued)

(56) References Cited

U.S. PATENT DOCUMENTS

| 2016/0028284 A1* | 1/2016 | Dajaku | H02K 3/12 310/54 |
| 2016/0043613 A1* | 2/2016 | Patel | H02K 9/22 310/52 |

FOREIGN PATENT DOCUMENTS

| DE | 102012020958 A1 | 4/2014 | |
| DE | 102012022451 A1 * | 5/2014 | ............... H02K 1/20 |

(Continued)

OTHER PUBLICATIONS

International Search Report in International Application No. PCT/FR2020/050311, mailed Apr. 14, 2020, with English translation (5 pages).

(Continued)

*Primary Examiner* — Jose A Gonzalez Quinones
(74) *Attorney, Agent, or Firm* — Bookoff McAndrews, PLLC

(57) ABSTRACT

An assembly including a winding and a cooler in contact with conductors of the winding, the cooler including a container forming a heat dissipator and including a phase change material having the ability to absorb a surplus quantity of heat when the conductors of the winding are subject to an increase in their current density and the heat dissipator is composed of at least two hollow parts separate and nestable with one another and intended to house the phase change material.

12 Claims, 4 Drawing Sheets

(58) Field of Classification Search
USPC .............................. 310/54, 215, 52, 201, 214
See application file for complete search history.

(56) References Cited

FOREIGN PATENT DOCUMENTS

| DE | 102015207767 A1 | * | 11/2016 | ............... H02K 1/24 |
|----|----|----|----|----|
| EP | 2985885 A1 | | 2/2016 | |
| EP | 2985885 A1 | * | 2/2016 | ............... H02K 1/24 |
| WO | WO-2014063982 A2 | * | 5/2014 | ............... H02K 9/20 |
| WO | 2018060565 A1 | | 4/2018 | |
| WO | WO-2018060565 A1 | * | 4/2018 | ............... H02K 3/24 |
| WO | 2018202963 A1 | | 11/2018 | |
| WO | WO-2018202963 A1 | * | 11/2018 | ............... H02K 1/32 |

OTHER PUBLICATIONS

Written Opinion of the International Searching Authority in International Application No. PCT/FR2020/050311, mailed Apr. 14, 2020, with English translation (8 pages).

\* cited by examiner

ELECTRICAL MACHINE WINDING HAVING IMPROVED COOLING

CROSS-REFERENCE TO RELATED APPLICATIONS

This application is the U.S. national phase entry under 35 U.S.C. § 371 of International Application No. PCT/FR2020/050311, filed on Feb. 19, 2020, which claims priority to French Patent Application No. 1901775, filed on Feb. 21, 2019.

TECHNICAL FIELD

The invention relates to the field of cooling of electrical machines with high power density and more specifically relates to a winding having improved cooling and any assembly including such a winding.

BACKGROUND

The development of "more electrical" aircraft and the subsequent need for high-power electrical machines (in the order of a hundred kW to a few MW) requires the taking into account of heat transfers from the design phase of the electrical machines, since current densities can reach very high values.

In this situation, the windings are frequently the main sources of losses in electrical machines. However, the maximum temperature of the windings (dictated by the maximum temperature of the insulators of the conductors) limits the current density the machine can withstand. Furthermore, the resistivity of the conductors of these windings and the subsequent Joule losses increase with temperature, which can decrease the efficiency of the machine.

The solutions commonly used for cooling electrical machines are essentially of three kinds: natural convection, forced convection by air and forced convection by liquid. Natural convection is the simplest solution, for which most of the heat is evacuated by the machine casing. Forced convection by air generally includes a fan, which increases the overall heat exchange coefficient but has disadvantages in terms of reliability and reduction of the overall weight. Forced convection by liquid of "water jacket" type allows good heat extraction, but the fluid circulation system can require the addition of a pump and a heat exchanger, which particularly complexifies the cooling system. However, in most of the cooling systems previously described, the heat produced in the windings must traverse the yoke and then the casing of the machine before being evacuated to the outside.

A solution for improving heat transfer is therefore to provide direct cooling of the coil heads of the windings which, due to their position at the periphery of the machine, generally form a hot point of the machine. Various known methods allow this direct cooling of the coil heads. Nozzles may be used to cool the axial or outer peripheries of the coil heads (if it is a so-called spray cooling method). Alternatively, a cooling fluid can circulate in the rotor of the machine, generally oil or fuel, and be directly sprayed onto the coil heads using the centrifugal effect caused by the rotation of the rotor. In this case, the fluid comes into contact with the inner periphery of the coil heads. One disadvantage of these methods is that oil can penetrate the air gap, which may lead to additional friction losses. Another lies in the potential damage of the insulators by erosion phenomenon if the spray speed is too high.

FIG. 3 is a simplified exploded view of an electrical machine 40 having a longitudinal rotation shaft 42 and including a laminated rotor 44 in the slots of which are mounted permanent magnets and an equally laminated stator 46, the rotor-stator assembly being mounted in a casing 48. The stator includes a plurality of windings (conductors 50) surrounding corresponding parts of the stator (cores, yokes or poles 52) and a part 54 of which is exposed at the outer periphery. This exposed part of each conductor is put in contact with a cooler of finned dissipator type 56 to evacuate the heat produced in the coil heads toward the periphery of the machine. The dissipation is done by conduction between the coil heads and an exchange surface of the dissipator, then by convection with the ambient air via fins of this dissipator, then by convection with the ambient air via fins of this dissipator, the fins increasing the convection surface and therefore the dissipation of the heat.

The recourse to phase change materials (PCM) as a simple and light alternative for cooling electrical machines and transformers, and particularly the use of heat pipes or the incorporation into the casing or the electronic element of the electrical machine to be cooled, is known. Provision has also been made for using these phase change materials directly into the impregnation material of the windings (typically an Epoxy resin) to improve their mechanical and thermal withstand and increase the electrical isolation between conductors.

However, in a limited environment (rack or poorly ventilated thermal engine), these solutions do not allow sufficient cooling of the windings to absorb the losses associated with the current density required for high powers. This is explained by the distance between the phase change material and the most thermally stressed areas of the windings (coil heads), which does not allow fast enough absorption of the heat, and therefore leads to an increase in the temperature of the windings.

The existing solutions incorporate PCMs into the active part of the machine (i.e. inside the slot). However, this space is typically filled with conductors and the Joule losses in the conductors being inversely proportional to the area of their section, incorporating the PCM into the slot is not always an optimal solution, since it reduces the space available for conductors, and therefore potentially increases Joule effect losses within the windings. A trade-off must be found between minimization of the generation of losses and installation of the cooling system.

SUMMARY OF THE INVENTION

The invention therefore makes provision for a new structure for cooling windings which improves the heat transfer properties (maximizes heat exchanges), by convection as by conduction, of the electrical machines. One aim of the invention is also to reduce Joule-effect losses as much as possible.

To do this, an assembly is disclosed comprising a winding and a cooler in contact with conductors of this winding, the cooler comprising a container forming a heat dissipator and comprising a phase change material having the ability to absorb a surplus quantity of heat when the conductors of the winding are subject to an increase in their current density, characterized in that the heat dissipator is composed of at least two hollow parts, separate and nestable with one another and intended to house the phase change material.

Thus, by disposing the new cooling structure in a unusually unused area within the machine and by having recourse to a phase change material to cool the conductors and particularly the coil heads (stator coil heads, or rotor coil heads in induction machines) of windings, for example of electrical machines, it is possible to absorb a large quantity of heat, while limiting the maximum temperature reached. Furthermore, cooling is improved (and Joule-effect losses reduced) without this increasing the generation of losses within the conductors and, by placing these materials in close proximity to the windings, the calories produced by the latter can be quickly extracted.

In particular, the fact that the container is nestable allows the simplified pre-filling with PCM and quick incorporation into the coil heads. Specifically, according to the case, the dissipator can be inserted into an already finished machine or during the winding.

Preferably, the phase change material has a phase change temperature between 100° C. and 300° C. and is advantageously a nitrate or a hydroxide preferably filled with graphite.

According to a particular embodiment, the heat dissipator is preferably made of an electrically insulating and thermally conductive material having a thermal conductivity greater than 10 W/(m·K).

Preferably, when the heat dissipator is made of an electrically conductive material, an electrically insulating and thermally conductive material is disposed between the conductors and the heat dissipator. This electrically insulating and thermally conductive material is for example alumina or alumide.

Advantageously, the heat dissipator is in direct contact with a casing to allow the transfer of heat by conduction toward the outside before or after the phase change of the phase change material.

According to another embodiment, the dissipator can include outer fins to provide the insulation between the conductors or inner fins for better transfer of heat within the phase change material and the container can also form a mold covering the conductors of the winding and embedding them in the phase change material.

The invention also relates to an element of an electrical machine, transformer or inductor or an electrical machine, transformer or inductor including a winding as previously described.

BRIEF DESCRIPTION OF THE DRAWINGS

Other features and advantages of this invention will become apparent from the detailed description given below, with reference to the following figures without any limitation and wherein.

DESCRIPTION OF THE EMBODIMENTS

Figure 1A:
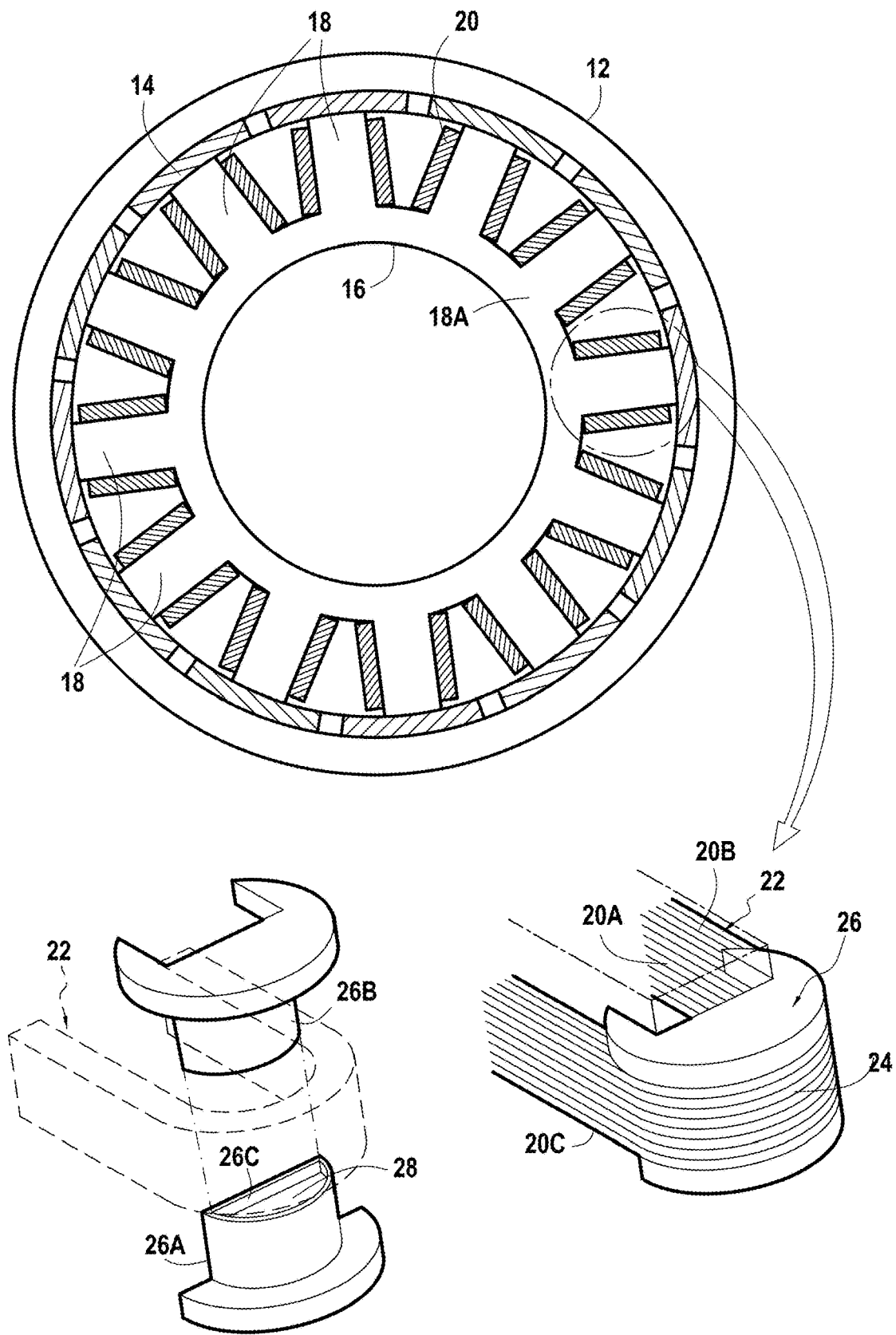
FIG. 1A illustrates in outside view and in a simplified manner an electrical machine including windings with improved cooling according to this invention.

FIG. 1A very schematically illustrates an electrical machine including an outer rotor comprising a rotor yoke 12 on the surface of which are disposed permanent magnets 14 and an inner stator comprising a stator yoke 16, concentric with the rotor. Around each tooth 18 of this stator is wound a winding 20 formed from a severality of conductors and having a coil body 22 and two coil heads 24 (the second opposite the first not being shown) exposed at the periphery 18A of this body. Each coil head 20 comprises an inner periphery surface 20A, an inner radial peripheral surface 20B and an outer radial peripheral surface 20C.

In accordance with the invention, each coil head 24 is mounted on a container forming a heat dissipator 26 to quickly extract the calories produced by these conductors and increase the exchange surface between the conductors and the environment. The heat dissipator which is advantageously formed of two separate hollow parts 26A, 26B nestable within one another, is interposed between the body and the conductors of the coil head and includes an inner cavity 26C for receiving in the liquid state a phase change material (PCM 28) having the ability to absorb a surplus quantity of heat when the conductors of the winding are subject to an increase in their current density and without this increasing the maximum achieved temperature driven by the intrinsic limit of the insulators used.

Various geometries may be considered to improve the thermal contact between the coil and the dissipator which can also contain outer fins (not shown) to provide the insulation between the conductors or inner fins for better heat transfer within the phase change material. More precisely, the inner peripheral surface 20A of the coil head covers the part of the heat dissipator including the phase change material 28 and the inner 20B and outer 20C radial peripheral surfaces of the coil head are brought into contact with walls of this heat dissipator thus ensuring the retaining of the conductors. The positioning of the container, in the space usually left free between the coil head and the tooth for such a concentric winding, makes it possible to limit the volume of the machine, since its total length is not increased, as could be the case if the container was disposed at the outer periphery of the coil heads. Note that this solution is not limited to the concentric winding and can be used in the case of the distributed winding described hereinafter.

In order to be able to incorporate phase change materials into a winding of an electrical machine, these materials must have a phase change temperature in the order of 100° C. to 300° C. They may be nitrates or hydroxides ($LiNO_3$, $NaNO_3$, $Li_2CO_3$ etc.) preferably filled with graphite and the phase change must have the property of being as congruent as possible in order to guarantee a very significant liquid-solid cycle.

The heat dissipator may be made of an electrically insulating and thermally conductive material having a good thermal conductivity (greater than 10 or 20 W/(m·K), phase change materials having a low thermal conductivity, in the order of 0.15 W/(m·K). If, on the other hand, the heat dissipator is made of an electrically conductive material, an electrically insulating and thermally conductive material must be disposed between the conductors and the heat dissipator. Appropriate materials such as alumina or alumide have been identified as good thermal conductors and electrical insulators.

Figure 1B:
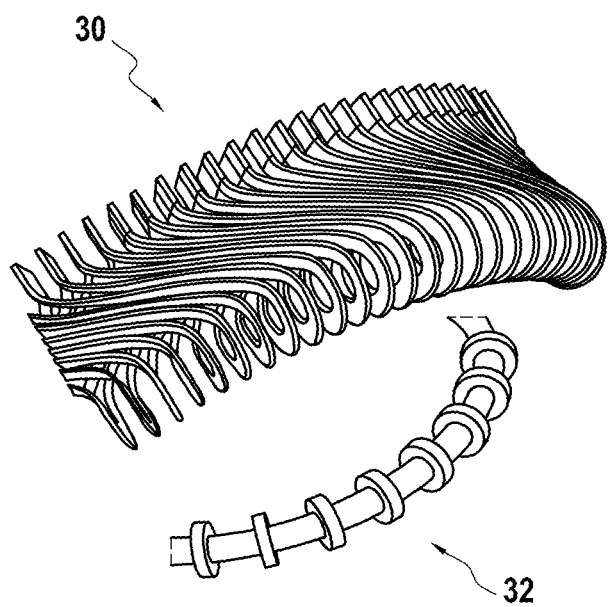
FIG. 1B illustrates in outside view several coil heads of a distributed winding machine and its associated cooler according to this invention.

Another solution which is not limited to the previous concentric winding is illustrated in FIG. 1B and relates to a distributed winding of a machine stator with a distributed winding, in which the coil heads of this machine bear the reference 30. These coil heads may for example house a container forming a heat dissipator 32 which can be inserted at the periphery of the windings to cool them. As in the previous example, this heat dissipator 32, intended to be filled with a liquid-solid phase change material, can be manufactured from several hollow parts which will then be nested with one another. The position of the container, in the space usually left free within the coil heads for such a distributed winding, makes it possible to limit the volume of the machine, since its total length is not increased, as might be the case if the container was disposed on the outer periphery of the coil heads.

Whatever the situation envisioned, the heat dissipator may be in direct contact with the casing or the slot wedges to allow the transfer of heat by conduction toward the outside before or after the phase change of the phase change materials.

Figure 1C:
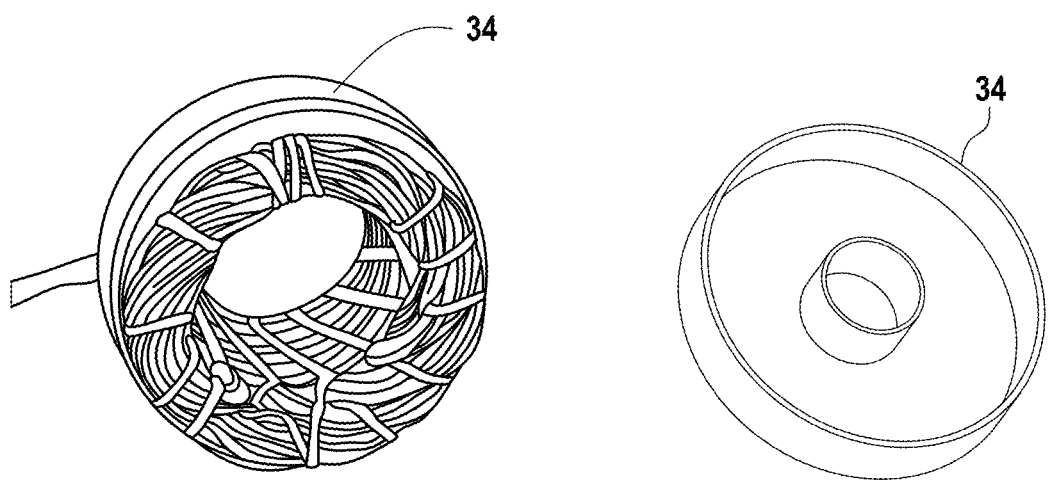
FIG. 1C illustrates in outside view several coil heads of a distributed winding machine and round conductors and its associated cooler.

Yet another solution illustrated by the machine with distributed winding and round conductors of FIG. 1C consists in implementing the (electrically insulated) conductors directly in contact with a phase change material and then placing a container forming a sealed jacket 34 (of "donut" type for example) around the coil heads to contain the dispersion of the material when it is in the liquid state. It may be noted that, in this case, the phase change material being directly in contact with the conductors, the sealed jacket (the mold covering the conductors and embedding them in the PCM) does not need to be made of a material with a good thermal conductivity, since the heat does not have to pass through it before being absorbed by the phase change material. It should be noted that in this solution, the coil heads will not be impregnated.

When it is in direct contact with the winding, the phase change material must however not be chemically unstable or be of a neutral (non-corrosive) nature to avoid damaging or corroding the insulator or copper.

Figure 2:
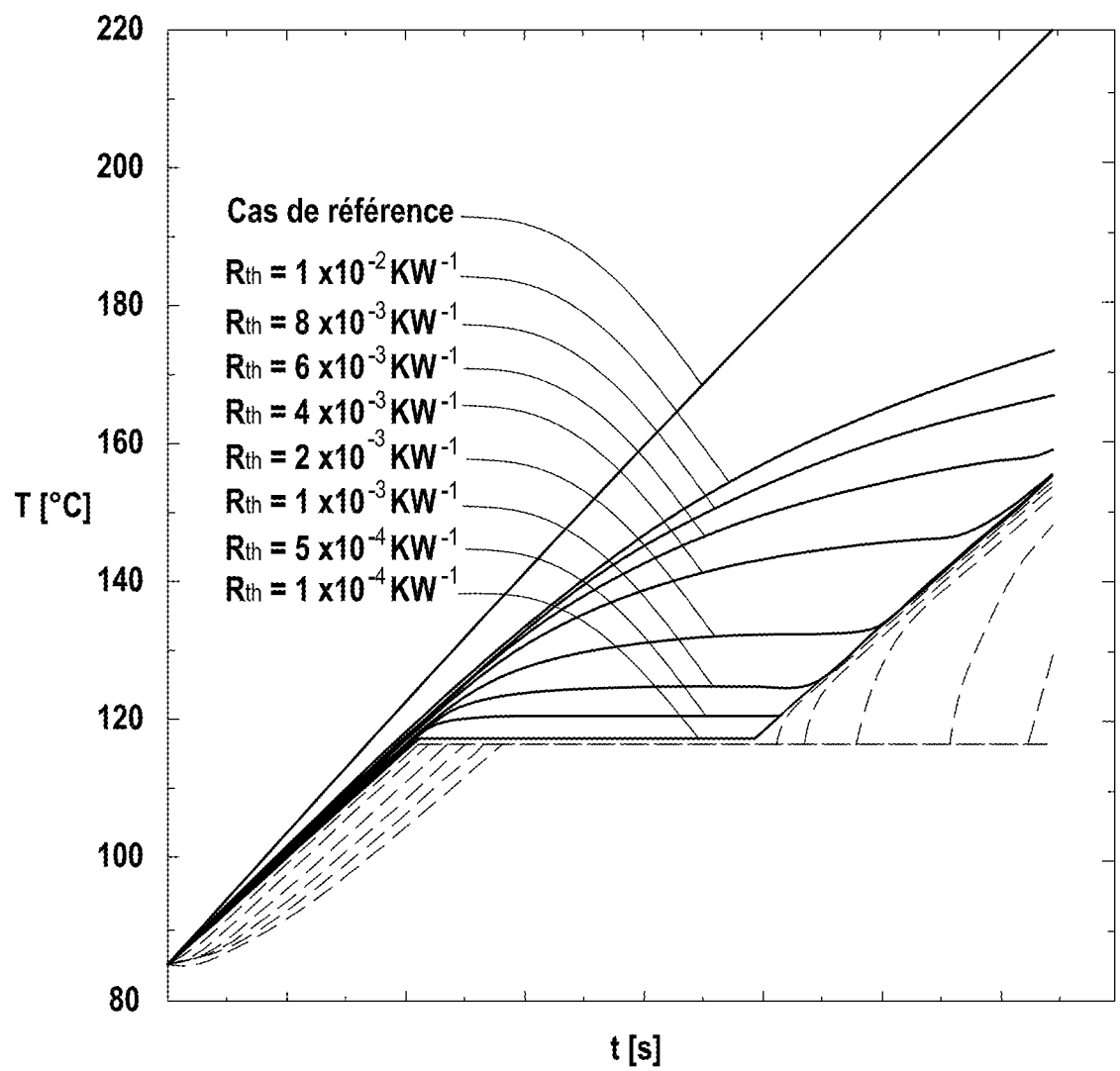
FIG. 2 is a curve illustrating the variation in temperature for different thermal contact resistances of the winding.
Figure 3:
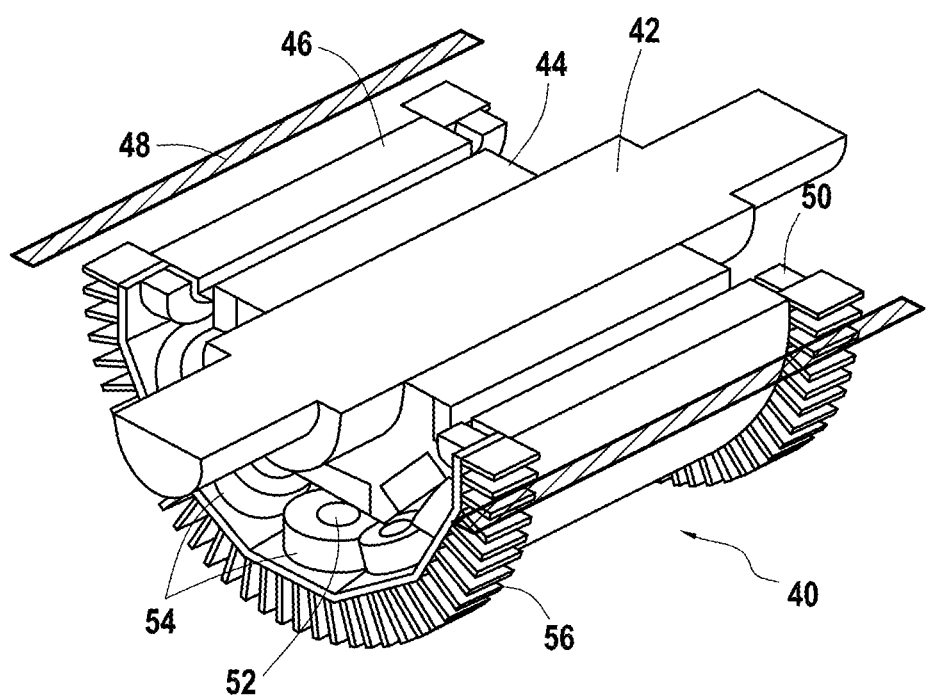
FIG. 3 shows an example of an electrical machine of the prior art.

First results from computer simulation of an incorporation of phase change materials in proximity to the windings are given in FIG. 2 which shows the variation in the winding temperature for several thermal contact resistances. Over a clearly-defined cycle, it can be seen that the temperature reached without such a material (reference case—first straight line) could be above 200° C., which would have the consequence, for example, of causing damage to the winding insulator. On the other hand, by adding a phase change material and taking into consideration an optimized thermal resistance between the material and its backing, the maximum temperature reached on the sensitive component will remain below its limit temperature (following curves).

Thus with the invention, an increase in electromagnetic performance is obtained by the increase in the intensity of the electrical current traversing the winding, clearly greater than those of the machines of the prior art. Alternatively, a reduction is obtained in the section of the wire of the conductors and therefore a reduction in the weight of the machine. Finally, the cooling system is simplified (no fan or pump so no risk of failures) and light. In addition, the fact of placing the dissipator in a space usually left free makes it possible to minimize the volume occupied by the electrical machine.

It is important to note that the field of the invention is not limited to the cooling of the windings of electrical machines but also includes the cooling of any system including wound elements, such as inductors or transformers.

The invention claimed is:

1. An assembly comprising a stator, wherein the stator includes a plurality of teeth protruding from the stator such that each of the plurality of teeth forms a cooler in contact with conductors of a winding, the winding being formed from a plurality of conductors having a coil body and coil heads, the cooler comprising a container forming a heat dissipator and comprising a phase change material having the ability to absorb a surplus quantity of heat when the conductors of the winding are subject to an increase in their current density, wherein the heat dissipator is composed of at least two hollow parts separate and nestable with one another and intended to house the phase change material and wherein the heat dissipator is interposed between the coil body and the coil heads.

2. The assembly as claimed in claim 1, wherein the phase change material has a phase change temperature between 100° C. and 300° C.

3. The assembly as claimed in claim 1, wherein the phase change material is a nitrate or a hydroxide perferably filled with graphite.

4. The assembly as claimed in claim 1, wherein the heat dissipator is made of an electrically insulating and thermally conductive material having a thermal conductivity greater than 10 W/(m·K).

5. The assembly as claimed in claim 1, wherein, when the heat dissipator is made of an electrically conductive material, an electrically insulating and thermally conductive material is disposed between the conductors and the heat dissipator.

6. The assembly as claimed in claim 4, wherein the electrically insulating and thermally conductive material is alumina or alumide.

7. The assembly as claimed in claim 1, wherein the heat dissipator is in direct contact with a casing to allow the transfer of heat by conduction toward the outside before or after the phase change of the phase change material.

8. The assembly as claimed in claim 1, wherein the dissipator includes outer fins to provide the insulation between the conductors or inner fins for better transfer of heat within the phase change material.

9. The assembly as claimed in claim 1, wherein the container forms a mold covering the conductors of the winding and embedding them in the phase change material.

10. An element of an electrical machine, transformer or inductor or an electrical machine, transformer or inductor comprising the assembly as claimed in claim 1.

11. The assembly as claimed in claim 1, wherein the phase change material is a nitrate or a hydroxide filled with graphite.

12. The assembly as claimed in claim 1, wherein the coil heads include an inner periphery surface, an inner radial surface, and an outer peripheral surface such that the inner periphery surface is positioned adjacent to a portion of the heat dissipator that houses the phase change material, and the inner radial surface and the outer peripheral surface are in contact with walls of the heat dissipator.

* * * * *